P. B. GIBBS & J. C. BROWN.
Self-Setting Animal-Trap.

No. 166,927. Patented Aug. 24, 1875.

Witnesses:
E. C. Birks
James F. Johnson

Inventors
Peter B. Gibbs
James C. Brown

UNITED STATES PATENT OFFICE.

PETER B. GIBBS AND JAMES C. BROWN, OF LIBERTY, VIRGINIA.

IMPROVEMENT IN SELF-SETTING ANIMAL-TRAPS.

Specification forming part of Letters Patent No. 166,927, dated August 24, 1875; application filed January 29, 1875.

*To all whom it may concern:*

Be it known that we, PETER B. GIBBS and JAMES C. BROWN, of Liberty, in the county of Bedford and State of Virginia, have invented certain new and useful Improvements in Animal-Traps; and we do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1:
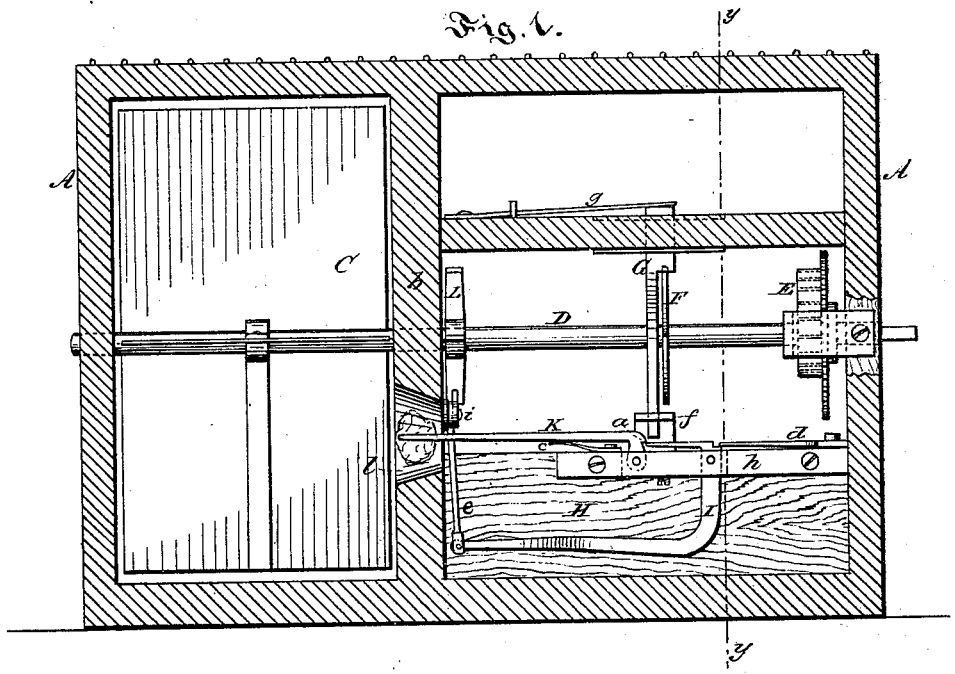
Figure 2:
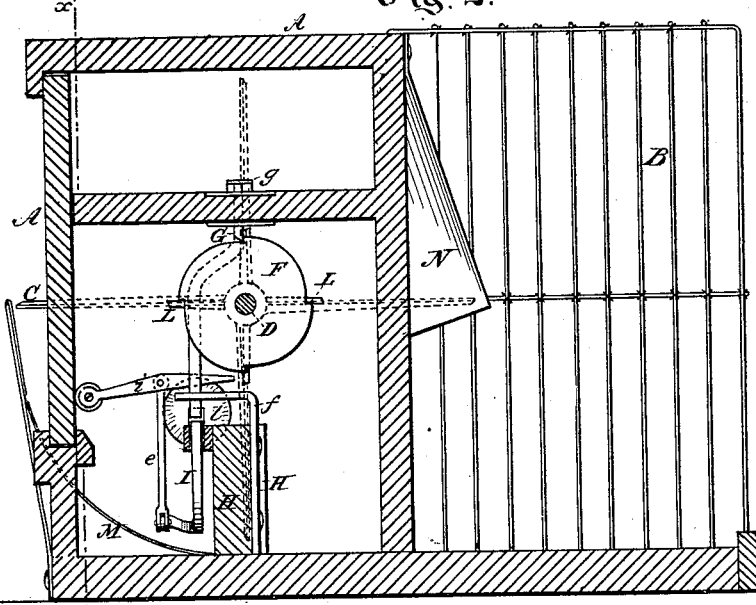

In the accompanying drawings, Figure 1 is a vertical section on the line $x\ x$ of Fig. 2. Fig. 2 is a vertical section on the line $y\ y$ of Fig. 2.

This invention belongs to the class of animal-traps usually called "cage-traps;" and it consists of a box or case with a revolving fan-wheel operated by a trigger arrangement and spring-winding apparatus, by which the animals are successively passed or forced into the cage, from which they may be removed by the usual door employed in such traps.

In the drawing, A represents the outer case or frame, with a wire cage, B, provided with the usual door. The front part of the case is divided by a partition, $b$, and on one side of this is arranged the revolving fan-wheel C, with four wings secured to the shaft D, which shaft has on its other end a spring-winding apparatus, E, that is wound up by a key in a similar manner to a clock. On the shaft D, about midway between the outer case A and the partition $b$, is secured a ratchet-wheel, F, with four teeth, with which a spring-pawl, G, engages. This pawl is held down by a spring, $g$, and its lower end passes through a guide, $f$, fastened to the cross-piece H. To said piece H a recessed bar, $h$, is secured, in the recess of which the dog I is pivoted, engaging at one end with a lip, $a$, on the trigger K, which is also pivoted in the bar $h$. A small spring, $c$, keeps the trigger in the proper position, and another spring, $d$, engages with the dog I. The dog I is bent downward and outward, and by a small link, $e$, connects with a pivoted lever, $i$, which is actuated by a spider-wheel, L, on the shaft D. Said spider-wheel L is provided with four arms. A guard, M, in front of the fan-wheel C prevents the animal going in any direction but to the bait, which is secured to the outer pointed end of the trigger K, and protrudes through a hole, $l$, in the partition $b$. Another guard, N, prevents the animal from getting out of the cage, when once it is passed or forced in.

Of course the traps may be made of any suitable material, and of any desired size and shape, and they can be made very cheap.

The operation is as follows: The bait is placed on the end of trigger K, and the clock mechanism wound up. The animal, gnawing at the bait, disengages the lip $a$ of the trigger, when the end of the spring-dog I strikes against the lower part of the pawl G, which disengages the ratchet and allows the shaft D and fan-wheel C to revolve. By this means the animal is thrown or forced into the cage B. When the shaft D revolves, an arm of the spider L comes in contact with the lever $i$, which, through the link $e$, throws back the dog I, and causes it to re-engage with the lip $a$ of the trigger. At the same time the spring $g$ forces down the pawl G, which re-engages the ratchet-wheel F, and prevents the shaft from turning more than a quarter revolution. The operation may then be repeated.

Having thus described our invention, what we claim, and desire to secure by Letters Patent, is—

The combination of the fan-wheel C, trigger K, dog I, and pawl G with a ratchet, F, shaft D, spider L, lever $i$, links $e$, and winding apparatus E, all constructed and arranged for operation, substantially as shown and described.

In testimony that we claim the foregoing as our own we hereby affix our signatures in presence of two witnesses.

PETER B. GIBBS.
JAMES C. BROWN.

Witnesses:
E. C. BURKS,
JAMES F. JOHNSON.